United States Patent
Schaebel

(10) Patent No.: US 8,821,620 B2
(45) Date of Patent: Sep. 2, 2014

(54) DRYING AGENT CARTRIDGE AND AIR TREATMENT SYSTEM WITH DRYING AGENT CARTRIDGE

(75) Inventor: Stefan Schaebel, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 196 days.

(21) Appl. No.: 13/468,753

(22) Filed: May 10, 2012

(65) Prior Publication Data

US 2012/0312171 A1 Dec. 13, 2012

Related U.S. Application Data

(63) Continuation of application No. PCT/EP2010/067113, filed on Nov. 9, 2010.

(30) Foreign Application Priority Data

Nov. 11, 2009 (DE) .......................... 10 2009 052 785

(51) Int. Cl.
*B60T 17/00* (2006.01)
*B01D 53/26* (2006.01)

(52) U.S. Cl.
USPC ....................... 96/147; 55/DIG. 17

(58) Field of Classification Search
USPC ............... 96/108, 147, 149; 55/491, DIG. 17; 34/80, 472, 473
See application file for complete search history.

(56) References Cited

U.S. PATENT DOCUMENTS

| 3,262,570 | A | * | 7/1966 | Borsetti et al. ................ 210/266 |
| 5,286,283 | A | * | 2/1994 | Goodell .......................... 96/113 |
| 5,779,772 | A | * | 7/1998 | Unger et al. .................... 96/137 |
| 5,792,245 | A | * | 8/1998 | Unger et al. .................... 96/137 |
| 5,851,269 | A | | 12/1998 | Strope |
| 6,484,413 | B1 | * | 11/2002 | Larsson ........................... 34/80 |
| 2004/0094036 | A1 | * | 5/2004 | Nichols et al. .................. 95/148 |
| 2009/0193977 | A1 | | 8/2009 | Hilberer |
| 2009/0199523 | A1 | | 8/2009 | Hilberer |

FOREIGN PATENT DOCUMENTS

| CN | 101500869 A | 8/2009 |
| DE | 10 2006 037 307 A1 | 2/2008 |
| DE | 10 2006 037 311 A1 | 2/2008 |
| DE | 10 2007 046 167 A1 | 4/2009 |
| EP | 0 608 606 A1 | 8/1994 |
| EP | 2 140 924 A2 | 1/2010 |
| WO | WO 2004/071836 A1 | 8/2004 |
| WO | WO 2009/043428 A1 | 4/2009 |

OTHER PUBLICATIONS

International Preliminary Report on Patentability with Written Opinion dated May 24, 2012, including English translation (twelve (12) pages).

(Continued)

*Primary Examiner* — Frank Lawrence
(74) *Attorney, Agent, or Firm* — Crowell & Moring LLP

(57) ABSTRACT

A drying agent cartridge for a commercial vehicle includes a drying agent cartridge housing which is delimited at the top by a cover and at the bottom by a support element. The drying agent cartridge also has a drying agent container which is accommodated in the drying agent cartridge housing. The drying agent container is connected to the drying agent cartridge housing in a positively locking manner.

13 Claims, 5 Drawing Sheets

(56) References Cited

OTHER PUBLICATIONS

International Search Report dated Feb. 10, 2011 including English-language translation (Four (4) pages).

German Office Action dated Jul. 9, 2010 including English-language translation (Six (6) pages).

Chinese Office Action dated Jan. 30, 2014 (nine (9) pages).

* cited by examiner

DRYING AGENT CARTRIDGE AND AIR TREATMENT SYSTEM WITH DRYING AGENT CARTRIDGE

CROSS-REFERENCE TO RELATED APPLICATIONS

This application is a continuation of PCT International Application No. PCT/EP2010/067113, filed Nov. 9, 2010, which claims priority under 35 U.S.C. §119 from German Patent Application No. DE 10 2009 052 785.0, filed Nov. 11, 2009, the entire disclosures of which are herein expressly incorporated by reference.

This application contains subject matter related to U.S. application Ser. No. 13/468,773, entitled "Air Treatment System," and application Ser. No. 13/468,789, entitled "Air Treatment Device" both being filed on even date herewith.

BACKGROUND AND SUMMARY OF THE INVENTION

The present invention relates to a drying agent cartridge accommodated in a housing and to an air treatment system with such a drying agent cartridge.

Such air treatment devices and drying agent cartridges are used in commercial vehicles, in particular trucks and tractors. The latter frequently have one or more compressed air consumers which have to be supplied with treated compressed air. Typical compressed air consumers are, for example, a compressed air braking system, a pneumatic spring system, or a parking brake system. A compressed air supply device which in particular has an air treatment system is provided in order to supply the commercial vehicle with compressed air. The air treatment system is intended to provide, in particular, dried and purified air. For this purpose, an air treatment system is generally provided with an air dryer device which frequently also has filter devices for filtering the air. In order to permit easy maintenance and replacement of the filters and, for example, of drying agent, use is generally made of a drying agent cartridge as the air dryer device, which can be connected to the air treatment system or can be inserted into the latter. In order to connect the air dryer device to the air treatment system, a quarter turn connection or a quarter turn fastener is frequently used in this case. The quarter turn connection connects the air dryer device to the air treatment system via a plug-in and turn connection. Examples of quarter turn fasteners for connecting drying agent cartridges to air treatment systems are described in DE 10 2006 037 311 A1, to which reference is hereby explicitly made.

During the mounting or removing of a drying agent cartridge on or from an air treatment system, torques are exerted on various components of the air treatment system and of the drying agent cartridge. If, for example, a quarter turn ring of a quarter turn fastener for fastening the drying agent cartridge to the air treatment system is used, a torque can be exerted on the housing of the air treatment system, the drying agent cartridge and the covering housing surrounding the drying agent cartridge by rotation of the quarter turn ring. The torques may cause the components to rotate in relation to one another, which may have an adverse affect on the operability of the quarter turn fastener and the service life thereof.

In particular, the quarter turn lugs of the individual components, which quarter turn lugs are covered by the quarter turn ring, may not lie congruently above one another and an optimum distorted force flux may occur when the air treatment system is charged with pressure. Furthermore, difficulties may arise during the removal of the drying agent cartridge if the quarter turn lugs are not congruent since the quarter turn ring can then possibly only be removed with difficulty, if at all. However, an incorrectly or not completely operable quarter turn fastener constitutes a considerable safety risk. Furthermore, incorrectly oriented components, which are rotated in relation to one another, of a drying agent cartridge or of an air treatment system may lead to a non-uniform throughflow of air and therefore to a reduced performance of the air treatment system.

An improved air treatment system and an improved drying agent cartridge are therefore required.

It is an object of the present invention to provide an air treatment system with rotationally secure and readily aligned components.

According to the invention, a drying agent cartridge is provided for a commercial vehicle, the drying agent cartridge having a drying agent cartridge housing which is upwardly bounded by a cover and is downwardly bounded by a support element. Furthermore, the drying agent cartridge has a drying agent container which is accommodated in the drying agent cartridge housing. The drying agent container is connected to the drying agent cartridge housing in a form-fitting manner. In particular, the drying agent container can contain a drying agent. According to the invention, the drying agent container and the drying agent cartridge housing can be aligned correctly with each other in a simple manner, thus resulting in a desired angular orientation and, during operation, air can flow through uniformly. Furthermore, the production of the drying agent cartridge is simplified, since the form-fitting connection makes it possible easily to recognize whether the components of the drying agent cartridge are correctly installed. Furthermore, the form-fitting connection results in a coupling of the drying agent cartridge housing and drying agent container, the coupling leading to better securing of said components against rotation in relation to each other.

Provision may be made for the drying agent container to be connected to the support element by at least one pin which is received in a recess. Pins and associated recesses can be provided by simple processes during production and lead to a reliable, form-fitting connection which is easy to fit. Furthermore, pins which are not introduced correctly into recesses lead rapidly to a tilting of components in relation to one another, thus making erroneous installation clearly noticeable.

The drying agent container can advantageously have at least one pin which is received in a recess of the support element. As an alternative, it is possible for the drying agent container to have at least one recess which receives a pin of the support element. A further possibility consists in the drying agent container having pins and recesses which interact with associated pins and recesses of the support element. Such a combination results in a particularly good and stable form-fitting connection.

In one embodiment, provision is made for the drying agent container to have a drying agent cover which is connected to the cover in a form-fitting manner. The upper components are therefore coupled to each other. It is particularly advantageous if the drying agent container is connected both in the cover region thereof to the cover of the drying agent cartridge housing and also in the lower region thereof to the support element in a form-fitting manner. This avoids an internal rotation of components of the drying agent cartridge.

In particular, provision may be made for the drying agent cover to include at least one drying agent cover rib which is connected in a form-fitting manner to at least one cover rib of the cover. In this case, the drying agent cover may expediently have more than one drying agent cover rib. A rib structure permits a stable construction and, at the same time, permits a throughflow of air. It is particularly advantageous here if a drying agent cover rib is received between two cover ribs. The cover ribs therefore form a type of guide for the drying agent cover rib, the guide firstly permitting and requiring correct installation. Secondly, the ribs are coupled upon rotation. Of course, it is analogously possible to accommodate a cover rib between two drying agent cover ribs. A combination of rib arrangements of this type may also be expedient.

It is particularly advantageous if the cover ribs and the drying agent cover ribs lie substantially one above another in an axial direction. The ribs therefore at least partially cover one another and permit a greater cross section for a throughflow of air. Should ribs also be used in the region of the support element, it is particularly expedient if the ribs are also covered by the cover ribs and the drying agent cover ribs in the axial direction.

In a particularly preferred embodiment, the drying agent cartridge has at least one recess for receiving a pin of a housing of an air treatment system of a commercial vehicle. The drying agent cartridge advantageously comprises at least two recesses with a differing cross section for receiving pins of a housing of an air treatment system of a commercial vehicle. The pins are expediently designed in such a manner that the cross sections thereof correspond to the cross sections of the recesses. The drying agent cartridge may also have one or more pins which are provided for receiving in recesses of the housing, or may have at least one pin and at least one recess. By way of the pins and the associated recesses, the housing is secured against rotation in relation to the drying agent cartridge. By use of different cross-sectional shapes, installation of the drying agent cartridge on the housing in a desired angular orientation can be ensured.

The invention also comprises an air treatment system for a commercial vehicle with an above-described drying agent cartridge.

Furthermore, the invention relates to an air treatment system for a commercial vehicle with a housing, a drying agent cartridge which is connected or connectable to the housing, and with a covering housing for covering the drying agent cartridge. The covering housing is connected or connectable to the drying agent cartridge in a form-fitting manner. In particular, the covering housing may be formed separately from the drying agent cartridge and fitted only upon installation of the drying agent cartridge such that the covering housing covers and protects a part of the drying agent cartridge that protrudes from the housing. The form-fitting connection between the drying agent cartridge and covering housing facilitates correct installation and leads to coupling of the covering housing and drying agent cartridge during rotational movements, thus making it possible to avoid rotation of the components in relation to one another upon the action of a torque.

In particular, provision may be made for the covering housing to have a pin which is received in a recess of the drying agent cartridge. As an alternative, the covering housing may have a recess in which a pin of the drying agent cartridge is received. Optionally, a combination may also be provided, in which both the covering housing and the drying agent cartridge each have at least one pin and a recess.

In a particularly preferred embodiment, provision is made for the drying agent cartridge and the housing to be connected or connectable by a quarter turn fastener. The drying agent cartridge, the housing and the covering housing may also be connected or connectable by a quarter turn fastener. A quarter turn fastener provides a good and reliable connection with a small overall height.

It is particularly advantageous if the drying agent cartridge has a quarter turn lug with a recess for receiving a pin of the covering housing. This is expedient since, when a quarter turn fastener is used, the covering housing and the drying agent cartridge are generally in contact with each other in the region of the quarter turn lugs thereof and therefore structures which are already present serve for the provision of the pin and the recess. Furthermore, a quarter turn lug provides a protruding structure which is particularly readily suitable for attaching a device for producing a form-fitting connection.

Furthermore, provision may be made for the drying agent cartridge and the housing to be connected to each other by at least one pin arranged in a recess. It is particularly advantageous if the drying agent cartridge has two or more recesses of differing cross section, which are designed to receive corresponding pins of the housing. The pins are expediently designed in such a manner that the cross sections thereof correspond to the cross sections of the recesses. The drying agent cartridge may also have one or more pins which are provided for receiving in recesses of the housing, or may have at least one pin and at least one recess. The pins and the associated recesses result in a securing of the housing against rotation in relation to the drying agent cartridge. By use of the different cross-sectional shapes, installation of the drying agent cartridge on the housing in a desired angular alignment can be ensured. Overall, a coupling and an associated securing of the housing, the drying agent cartridge and the covering housing against rotation can therefore be achieved.

It is particularly advantageous if the drying agent cartridge is a drying agent cartridge as described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
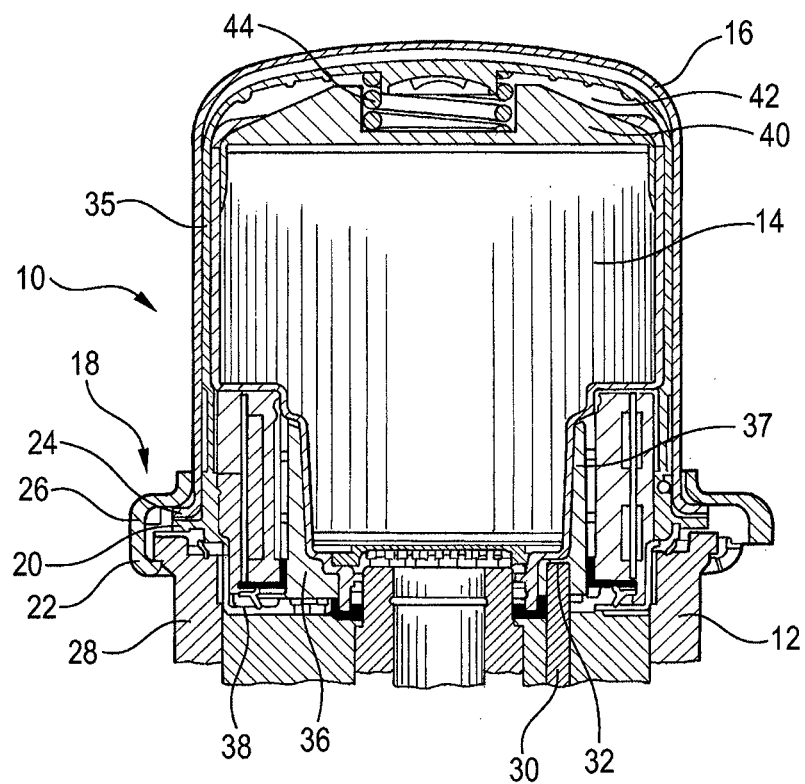
FIG. 1 is a lateral cross-sectional view of an air treatment system.

FIG. 1 shows a lateral cross section of an air treatment system. An air treatment system 10 with a housing 12, on which a drying agent cartridge 14 is accommodated, is shown. The drying agent cartridge 14 is covered from above by a covering housing 16. A quarter turn fastener 18 with a quarter turn ring 20 connects the housing 12 of the air treatment system 10, the drying agent cartridge 14 and the covering housing 16 to one another. For this purpose, in this construction, a quarter turn lug 22 of the quarter turn ring 20, a quarter turn lug 24 of the covering housing 16, a quarter turn lug 26 of the drying agent cartridge 14 and a quarter turn lug 28 of the housing 12, which interact in a known manner, are provided, in each case on the left and right in the drawing. It is not necessary for two quarter turn lugs 22, 24, 26, 28 to be present in each case, as shown; instead, it is also possible for only one or for more than two quarter turn lugs 22, 24, 26, 28 to be provided per component. The ring 20 of the quarter turn fastener 18 is rotatable in a known manner in order to release the drying agent cartridge 14 and the covering housing 16.

The housing 12 has a pin 30 which is received in a matching recess 32 of the drying agent cartridge 14. By way of the interaction of the pin 30 with the recess 32, the drying agent cartridge 14 is secured against rotation against the housing 12 of the air treatment system 10. A further housing pin and a corresponding recess in the drying agent cartridge, which each differ in design to the pin 30 and the recess 32, are not shown.

In the exemplary embodiment shown, two such recesses 32 are therefore provided for housing pins 30, said recesses being of differing design such that they receive housing pins 30 of differing design. This makes it possible to prevent the drying agent cartridge 14 from being placed incorrectly onto the housing 12. Of course, any suitable number of housing pins and associated recesses can be used.

The drying agent cartridge 14 includes a drying agent container 36 and a support element 38. A drying agent for drying the air (not illustrated) and filters for cleaning the air are accommodated in the drying agent container 36. Furthermore, the drying agent container 36 is provided with ribs 37 which are distributed around the container and of which two are shown in FIG. 1; the ribs 37 may be provided in a suitable number (there are 12 ribs in this construction) such that they firstly provide sufficient stability and secondly do not greatly obstruct an air flow. A drying agent cover 40 which upwardly bounds the drying agent container 36 is provided at the upper end of the drying agent cartridge 14. The drying agent cartridge 14 itself is upwardly bounded by a dedicated cover 42, which is located above the drying agent cover 40 and is arranged within the covering housing 16. A spring 44 is supported on the drying agent cover 40 and tensions the drying agent container 36 between the support element 38 and cover 42. The drying agent container 36 is therefore accommodated within a drying agent cartridge housing 35 having side walls, which housing is upwardly bounded by the cover 42 and is downwardly bounded by the support element 38. In this case, the drying agent cartridge housing 35 may be designed in such a manner that it is air-permeable at suitably selected points in order to permit an air flow, which is desired during operation, to and from the drying agent container 36. Provision may furthermore be made for the side walls of the drying agent cartridge housing 35 and for the cover 42 to be formed integrally, for example by the side walls protruding in the manner of tabs from the cover 42. The drying agent cartridge 14 includes the drying cartridge housing 35 and the components located therein. The covering housing 16 is formed separately therefrom and serves for covering, sealing and protecting the drying agent cartridge 14 when the latter is fitted on the housing 12 of the air treatment system 10.

Figure 2:
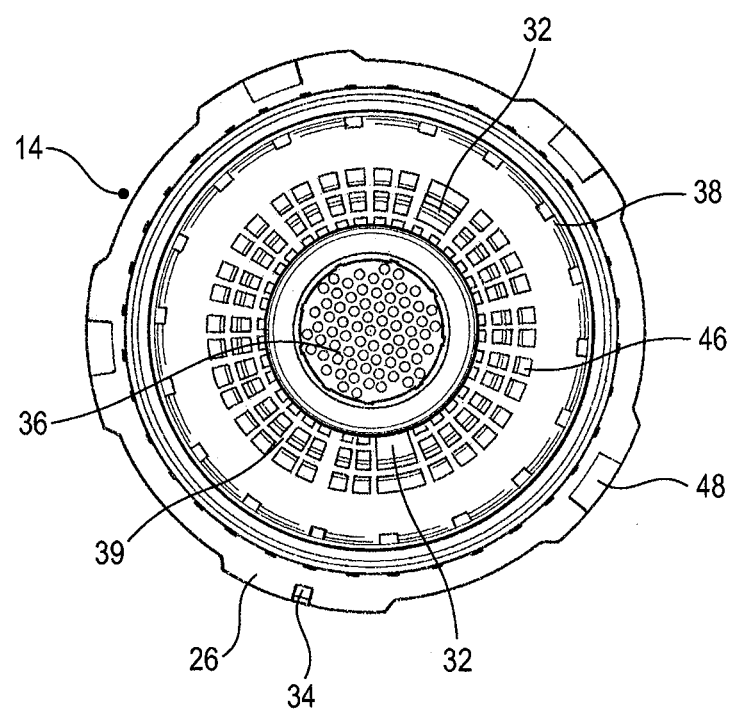
FIG. 2 is a view of a drying agent cartridge from below.

FIG. 2 shows a view of the drying agent cartridge 14 from below. The annular structure arranged on the outside comprises the quarter turn lugs 26 of the drying agent cartridge 14. A recess 34 can furthermore be seen in one of the quarter turn lugs 26, said recess receiving the pin 50 (FIG. 3) of the covering housing 16. The other lugs 26 have depressions 48 which facilitate the removal of the drying agent cartridge 14 by providing space for a tool, such as a screwdriver, in order to be able to lever the drying agent cartridge 14 out of the housing 12.

The support element 38 has ventilation holes 46 and support ribs 39. Furthermore, recesses 32 of differing design for receiving pins 30, which are of differing design, of the housing 12 are provided. The somewhat lighter structure represents the lower side of the drying agent container 36 which is partially concealed by the support element 38 in this view. As is seen, the support element 38 and drying agent container 36 are angularly oriented with respect to each other in such a manner that the ribs 37 of the drying agent container 36 and the support ribs 39 lie directly one above another and therefore no unnecessary air resistance to air flowing through is produced. In this case, it is not necessary for an equal number of ribs 37 and 39 to be present. In the construction described, the number of ribs 37 amounts to half the number of support ribs 39, which ensures sufficient stability of the drying agent container.

Figure 3:
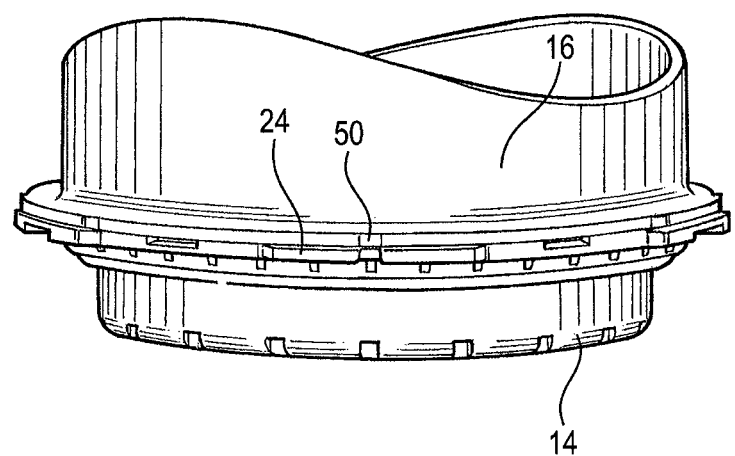
FIG. 3 is a lateral view of a form-fitting connection of a covering housing with an air dryer cartridge.

FIG. 3 shows, in a lateral view, how the covering housing 16 is connected to the drying agent cartridge 14. The lug 24 of the covering housing sits on the lug 26 of the drying agent cartridge 14. A covering housing pin 50 which is directed downward from the covering housing 16 and conceals the recess 34 in FIG. 3 is inserted into the recess 34 of the lug 26.

Figure 4:
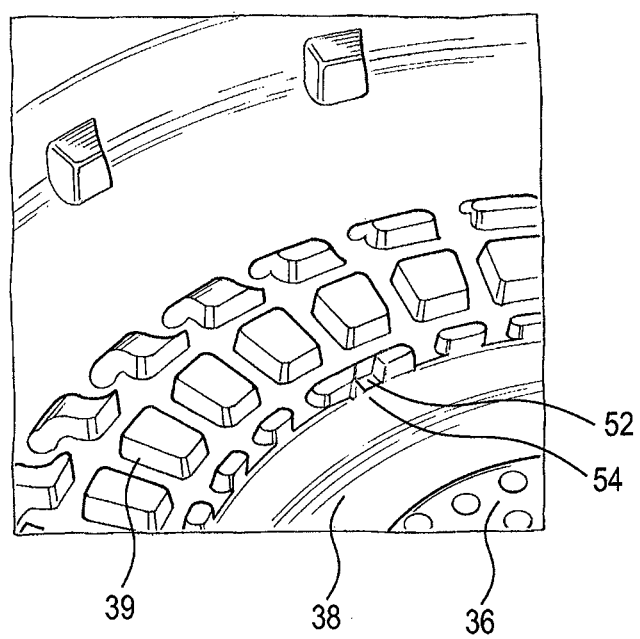
FIG. 4 is a view from below of a form-fitting connection of a support element with a drying agent container.

FIG. 4 shows a view of a detail of the drying agent cartridge 14 from below. The support ribs 39 of the support element 38 can clearly be seen. The drying agent container 36 is arranged above the support element 38. A container pin 52 which is fitted into a support recess 54 of the support element is provided on the drying agent container. As a result, it is ensured that the support element 38 and drying agent container 36 are connected to each other in a form-fitting manner and are oriented correctly with respect to each other since the components cannot be fitted together or only in a manner significantly tilted with respect to each other during assembly. A correct angular alignment of the support element 38 and of the drying agent container 36 is therefore ensured even during production of the drying agent cartridge 14. It is possible to provide a plurality of container pins and associated support recesses which are expediently each of differing design in order to ensure an unambiguous orientation of the drying agent container 36 and support element 38.

Figure 5:
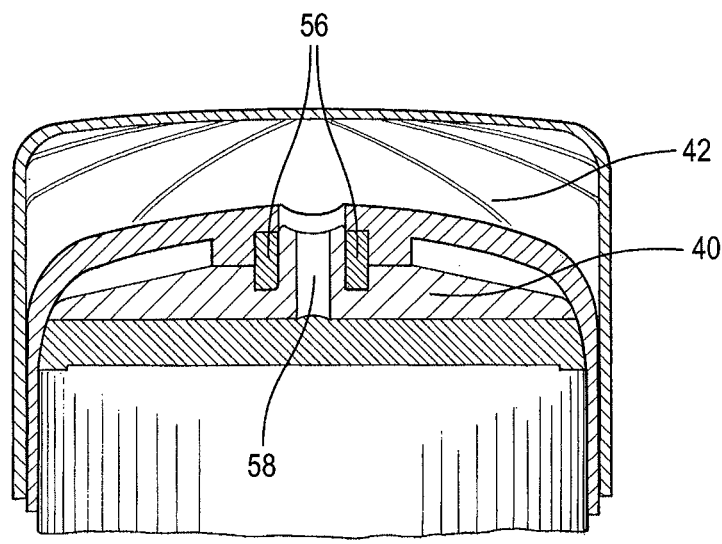
FIG. 5 is a lateral cross-sectional view of a form-fitting connection of a drying agent cover with a cover of a drying agent cartridge.

FIG. 5 shows a lateral cross section of the upper cover region of the drying agent cartridge 14. The cover 42 and the drying agent cover 40 are connected to each other likewise in a form-fitting manner, thus resulting in a precisely defined angular orientation between the cover 42 and drying agent cover 40. For this purpose, drying agent cover ribs 58, one of which is shown, are provided on the drying agent cover 40. The cover 42 also has cover ribs 56 which protrude downward in the direction of the drying agent cover 40 and of which in each case two in each case surround a drying agent cover rib 58. There is a degree of play between a drying agent cover rib 58 and the associated cover ribs 56 in order to facilitate the installation of the cover 42 onto the drying agent cover 40. By use of this rib arrangement, the cover 42 and drying agent cover 40 are in the desired orientation with respect to each other. Furthermore, during installation, the desired orientation can easily be set, and it can easily be determined if the desired orientation is not present, since the protruding ribs then ensure that the components tilt in relation to each other. In this construction, 12 drying agent cover ribs 58 are provided, but any other suitable number of drying agent cover ribs 58 can be used.

The pins 30, 50 and recesses 32, 34 of the described construction interact in such a manner that the housing 12, the drying agent cartridge 14 and the covering housing 16 are connected to one another in a manner secure against rotation. If the quarter turn ring 20 is namely rotated either for removal out of the position in which it connects the components—the housing 12, drying agent cartridge 14 and covering housing 16—to one another, or is rotated in the other direction in order to fit the components, the components—the covering housing 16, drying agent cartridge 14 and housing 12—are supported in relation to one another via the pin 30 in engagement with the recess 32 and the covering housing pin 50 in engagement with the recess 34 and therefore are not carried along by the rotation movement of the quarter turn ring. The components are therefore prevented from rotating in relation to one another.

The form-fitting connections, produced by pins and recesses, of the drying agent container 36 to the support element 38, on the one hand, and via the drying agent cover 40 to the cover 42, on the other hand, likewise act counter to a rotation of the components in relation to one another. Furthermore, they can easily be fitted already during production of the drying agent cartridge in such a manner that they are in the correct orientation to one another, i.e., they are in a precisely defined angular alignment with respect to one another. The effect achieved by this is that the components are optimally aligned with respect to one another in order, during operation of the air treatment system, to achieve a throughflow of air in as uniform a manner as possible. This results in an improved drying performance. In particular, the effect which can be achieved by the form-fitting connections is that the cover ribs 56, drying agent cover ribs 58, ribs 37 and support ribs 39 substantially overlap in the axial direction, which reduces the flow resistance of the drying agent cartridge 14 and avoids undesirable swirling of an air flow.

LIST OF REFERENCE NUMBERS

10 Air treatment system
12 Housing
14 Drying agent cartridge
16 Covering housing
18 Quarter turn fastener
20 Quarter turn ring
22 Quarter turn lug
24 Quarter turn lug
26 Quarter turn lug
28 Quarter turn lug
30 Housing pin
32 Recess
34 Recess
35 Drying agent cartridge housing
36 Drying agent container
37 Rib
38 Support element
39 Support rib
40 Drying agent cover
42 Cover
44 Compression spring
46 Ventilation holes
48 Depression
50 Covering housing pin
52 Container pin
54 Support recess
56 Cover rib
58 Drying agent cover rib The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drying agent cartridge for a commercial vehicle, comprising:
    a drying agent cartridge housing which is upwardly bounded by a cover and is downwardly bounded by a support element, the cover having at least one cover rib;
    a drying agent container which is accommodated in the drying agent cartridge housing;
    wherein the drying agent container is connected in a form-fitting manner to the drying agent cartridge housing; and
    wherein a drying agent container cover comprises at least one drying agent cover rib, which is connected in a form-fitting manner to the at least one cover rib of the cover.

2. The drying agent cartridge as claimed in claim 1, wherein the drying agent container contains a drying agent.

3. The drying agent cartridge as claimed in claim 1, wherein the drying agent container is connected to the support element by at least one pin received in a recess.

4. The drying agent cartridge as claimed in claim 2, wherein the drying agent container is connected to the support element by at least one pin received in a recess.

5. The drying agent cartridge as claimed in claim 3, wherein the drying agent container has at least one pin which is received in a recess of the support element.

6. The drying agent cartridge as claimed in claim 3, wherein the drying agent container has at least one recess which receives a pin of the support element.

7. The drying agent cartridge as claimed in claim 5, wherein the drying agent container has at least one recess which receives a pin of the support element.

8. The drying agent cartridge as claimed in claim 1, wherein an upper end of the drying agent container has the drying agent container cover.

9. The drying agent cartridge as claimed in claim 1, wherein the drying agent container cover has more than one drying agent cover rib.

10. The drying agent cartridge as claimed in claim 1, wherein each drying agent cover rib is accommodated between, in each case, two cover ribs of the cover.

11. The drying agent cartridge as claimed in claim 9, wherein each drying agent cover rib is accommodated between, in each case, two cover ribs of the cover.

12. The drying agent cartridge as claimed in claim 1, wherein the drying agent cartridge has at least two recesses of differing cross section for receiving pins of a housing of an air treatment system of a commercial vehicle.

13. An air treatment system for a commercial vehicle comprising:
    a drying agent cartridge comprising:
        a drying agent cartridge housing which is upwardly bounded by a cover and is downwardly bounded by a support element, the cover having at least one cover rib;
        a drying agent container which is accommodated in the drying agent cartridge housing;
        wherein the drying agent container is connected in a form-fitting manner to the drying agent cartridge housing; and
        wherein a drying agent container cover comprises at least one drying agent cover rib, which is connected in a form-fitting manner to the at least one cover rib of the cover.

* * * * *